United States Patent [19]

Ogawa

[11] Patent Number: 4,814,802
[45] Date of Patent: Mar. 21, 1989

[54] CAMERA SYSTEM

[75] Inventor: Hidehiro Ogawa, Tokyo, Japan

[73] Assignee: Nikon Corporation, Tokyo, Japan

[21] Appl. No.: 221,017

[22] Filed: Jul. 18, 1988

Related U.S. Application Data

[63] Continuation of Ser. No. 33,725, Apr. 3, 1987, abandoned.

[30] Foreign Application Priority Data

Apr. 8, 1986 [JP] Japan ............................ 61-80324
Apr. 8, 1986 [JP] Japan ............................ 61-80325
Apr. 8, 1986 [JP] Japan ............................ 61-52453[U]

[51] Int. Cl.$^4$ ............................................. G03B 17/24
[52] U.S. Cl. .................................. 354/105; 354/286
[58] Field of Search ............... 354/105, 106, 107, 108, 354/104, 62, 286

[56] References Cited

U.S. PATENT DOCUMENTS

| 4,053,909 | 10/1977 | Shinoda et al. | 354/105 |
|---|---|---|---|
| 4,217,046 | 8/1980 | Weinstein et al. | 354/106 |
| 4,344,682 | 8/1982 | Hattori | 354/106 |
| 4,477,164 | 10/1984 | Nakai et al. | 354/286 |
| 4,583,831 | 4/1986 | Harvey | 354/106 |
| 4,639,111 | 1/1987 | Harvey | 354/106 |
| 4,652,104 | 3/1987 | Harvey | 354/106 |

Primary Examiner—Russell E. Adams
Attorney, Agent, or Firm—Shapiro and Shapiro

[57] ABSTRACT

A camera system for storing photograph data for every photograph frame, comprises data transmission means for reading data of an attached camera accessory in the camera system; memory means for storing data sets for a plurality of camera accessories, each set consisting of peculiar data of one camera accessory and discrimination data corresponding to the peculiar data and represented by a smaller data volume than that of the peculiar data; and memory control means for causing the memory means to store only the discrimination data of the attached camera accessory, together with the photograph data in synchronism with a photographing operation or a wind-up operation of the camera in units of photograph frames.

45 Claims, 10 Drawing Sheets

| | | | |
|---|---|---|---|
| 000 | 0 | 0 | 1 |
| 001 | | 4 | 0 |
| 002 | 0 | 0 | 9 |
| 003 | | 4 | 2 |
| 004 | 1 | 0 | 6 |
| 005 | | 4 | 4 |
| 006 | 0 | 0 | 3 |
| 007 | | 4 | 8 |
| 008 | 0 | 0 | B |
| 009 | | 4 | A |
| 00A | | | |
| 00B | | | |
| 00C | | | |
| 00D | | | |

| | | | |
|---|---|---|---|
| 040 | 8 | 8 | 50 |
| 041 | 1 | 8 | 1.8 |
| 042 | 7 | 4 | 28 |
| 043 | 3 | 0 | 2.8 |
| 044 | 7 | C | 35 |
| 045 | 3 | 8 | 3.3 |
| 046 | A | 2 | 105 |
| 047 | 4 | 0 | 4.0 |
| 048 | A | A | 135 |
| 049 | 3 | 0 | 2.8 |
| 04A | C | 6 | 300 |
| 04B | 3 | 0 | 2.8 |
| 04C | | | |
| 04D | | | |

| | | |
|---|---|---|
| 100 | 8 | 6 |
| 101 | 0 | 9 |
| 102 | 2 | 5 |
| 103 | 7 | 0 |
| 104 | 5 | 0 |
| 105 | 0 | 1 |
| 106 | 8 | 6 |
| 107 | 0 | 9 |
| 108 | 2 | 6 |
| 109 | 8 | 0 |
| 10A | 7 | 0 |
| 10B | 0 | 9 |
| 10C | 8 | 6 |
| 10D | 0 | 9 |
| 10E | 2 | 6 |
| 10F | 9 | 0 |
| 110 | 4 | 0 |
| 111 | 0 | B |

| | | |
|---|---|---|
| 3FD | | |
| 3FE | 0 | 1 |
| 3FF | 1 | 2 |

- 100–104: DATE
- TV
- AV
- 105: DESCRIMINATION CODE
- 1st FRAME, 2d FRAME, 3d FRAME

15

```
FILM NO. 000123
  1     '86 10 23  13:01   1/125   F11    A
  2     '86 10 24   8:23   1/250   F8     P
  3
  4
```

CAMERA SYSTEM

This is a continuation application of Ser. No. 033,725 filed Apr. 3, 1987, now abandoned.

BACKGROUND OF THE INVENTION

1. Field of the Invention

The present invention relates to a camera system for storing photograph data for every photograph frame.

2. Related Background Art

Various conventional camera systems for storing photograph data such as a shutter speed, an aperture value, and the like, for each photograph frame are proposed.

However, when fixed data of an interchangeable lens used is to be stored in a nonvolatile memory in a camera body together with photograph data, for every photograph frame, data of a single-focal length lens, e.g., a 50 mm, F1.8 lens, requires a 2-byte memory area, data of a zoom lens, e.g., 35–105 mm, F3.3 lens, requires a 4-byte memory area, and data of a zoom lens, e.g., 200–400 mm, F4 lens, requires a 3-byte memory area. Therefore, a large memory area is required for every photograph frame, and the number of photograph frames which may be stored in the nonvolatile memory is decreased.

SUMMARY OF THE INVENION

It is an object of the present invention to provide a camera system, wherein a memory area necessary for every photograph frame is reduced, and photograph data and data of a camera accessory used can be stored in a limited memory area for as many photograph frames as possible.

In order to achieve the above object, according to an aspect of the present invention, there is provided a camera system for storing photograph data for every photograph frame, comprising:

data transmission means for reading data of an attached camera accessory in the camera system;

memory means for storing data sets for a plurality of camera accessories, each set consisting of peculiar data of one camera accessory and discrimination data corresponding to the peculiar data and represented by a smaller quantity of data than that of the peculiar data; and memory control means for causing the memory means to store only the discrimination data of the attached camera accessory, together with the photograph data in synchronism with a photographing operation or a wind-up operation of the camera in units of photograph frames.

In the camera system, data consising of sets of peculiar data and discrimination data of a plurality of camera accessories are stored in the memory means. When the photograph data is stored in the memory means in synchronism with the photographing operation or wind-up operation of the camera, the memory control means causes the memory means to store only the discrimination data of the attached camera accessory, together with the photograph data.

DETAILED DESCRIPTION OF THE PREFERRED EMBODIMENTS

Figure 1:
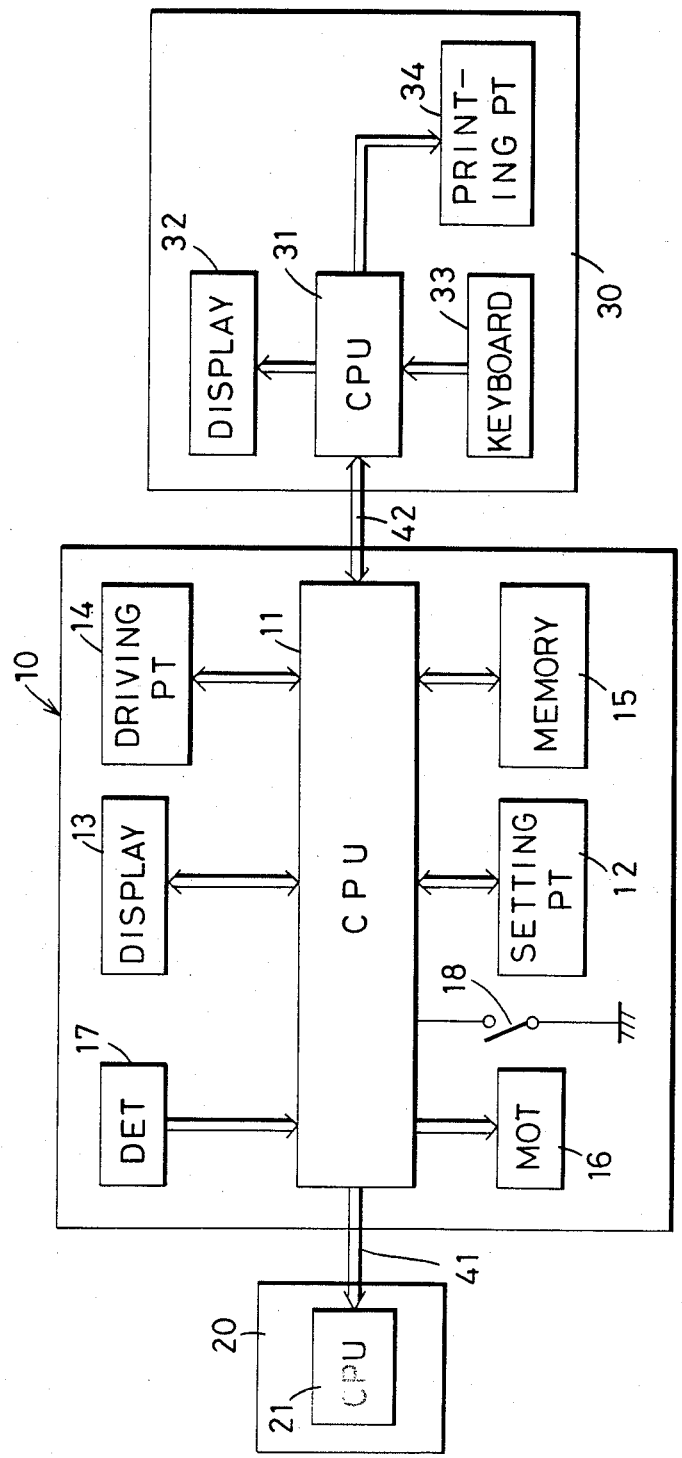
FIG. 1 is a block diagram of a camera system of an embodiment of the present invention.

FIG. 1 shows a camera system according to an embodiment of the present invention. The camera system comprises a camera body 10, an interchangeable lens 20 as a camera accessory, and a data back 30.

The camera body 10 comprises a CPU 11, a photograph information setting part 12 for sending photograph data such as a shutter speed, an aperture value, a film speed, an exposure value, and the like, to the CPU 11, a display 13 for displaying a shutter speed of the camera and the like, a driving part 14 for performing driving operations such as a shutter release operation, film wind-up operation, and the like, a nonvolatile memory 15, a motor 16 for feeding a film, a detector 17 for detecting completion of initial advance (to be described later), and a switch 18 which is turned on upon loading of a film cartridge.

The nonvolatile memory 15 stores a plurality of data sets each consisting of a focal length code and a full-aperture f-number code as peculiar data of a lens, and a discrimination code of the lens. The memory 15 constitutes memory means for storing photograph data such as a photographing data, a shutter speed, and an f-number (aperture value), and the like. In this embodiment, the nonvolatile memory 15 stores the discrimination code and the photograph data for every photograph frame.

The interchangeable lens 20 has a CPU 21. The CPU 21 can send information to the CPU 11 of the camera body 10 through connecting means 41 as information transmission means.

The data back 30 comprises a CPU 31 for performing a timepiece operation, a display control operation, and the like, a display 32 having a display function and a print function, a keyboard 33 for setting a command, and a printing part 34 for printing photograph data on a film. The CPU 31 can send information to the CPU 11 through connecting means 42 as information transmission means.

The CPU 21 of the interchangeable lens 20 stores information such as a focal length code and a full-aperture f-number code as peculiar data, a discrimination code as discrimination data indicating the type of lens, and the like.

The CPU 11 in the camera body 10 can fetch information from the interchangeable lens 20 by serial transfer. The CPU 11 includes a control section for fetching information of the interchangeable lens 20 through the connecting means 41 by serial transfer and performing other control operations, a memory section consisting of a ROM (program memory) and a RAM (data memory), and an input/output section. A memory control means (to be described later) is constituted by the control section of the CPU 11. The photograph data set by the photograph information setting part 12 is fetched by the control section of the CPU 11, and is then stored in the nonvolatile memory 15 for every photograph frame.

The ROM in the CPU 21 of the lens stores any of the data shown in Table 1 below in accordance with the focal length and the full-aperture f-number of the lens.

TABLE 1

| Type of Lens | | Discrimination Code | |
|---|---|---|---|
| | | Upper 4 bits | Lower 4 bits |
| 50 | F1.8 | 0 | 1 |
| 50 | F1.4 | 0 | 2 |
| 135 | F2.8 | 0 | 3 |
| 24 | F2.8 | 0 | 4 |
| 20 | F2.8 | 0 | 5 |
| 35–105 | F3.3–4 | 0 | 6 |
| 200–400 | F4 | 0 | 7 |
| 800 | F8 | 0 | 8 |
| 28 | F2.8 | 0 | 9 |
| 28–85 | F3.3 | 0 | A |
| 300 | F2.8 | 0 | B |
| 400 | F4 | 0 | C |
| 600 | F5.6 | 0 | D |
| 800 | F8 | 0 | E |
| 35–135 | F4 | 0 | F |
| 85 | F1.4 | 1 | 0 |
| 200 | F2.8 | 1 | 1 |

The ROM in the CPU 11 in the camera body stores the following Tables 2 to 4.

TABLE 2

| Focal Length | Code | | | | | | | |
|---|---|---|---|---|---|---|---|---|
| | 7 | 6 | 5 | 4 | 3 | 2 | 1 | 0 |
| 20 | 0 | 1 | 1 | 0 | 1 | 0 | 0 | 0 |
| 24 | 0 | 1 | 1 | 0 | 1 | 1 | 1 | 0 |
| 28 | 0 | 1 | 1 | 1 | 0 | 1 | 0 | 0 |
| 35 | 0 | 1 | 1 | 1 | 1 | 1 | 0 | 0 |
| 50 | 1 | 0 | 0 | 0 | 1 | 0 | 0 | 0 |
| 85 | 1 | 1 | 0 | 1 | 1 | 0 | 1 | 0 |
| 105 | 1 | 0 | 1 | 0 | 0 | 0 | 1 | 0 |
| 135 | 1 | 0 | 1 | 0 | 1 | 0 | 1 | 0 |
| 150 | 1 | 0 | 1 | 0 | 1 | 1 | 1 | 0 |
| 180 | 1 | 0 | 1 | 1 | 0 | 1 | 0 | 0 |
| 200 | 1 | 0 | 1 | 1 | 1 | 0 | 0 | 0 |
| 300 | 1 | 1 | 0 | 0 | 0 | 1 | 1 | 0 |
| 400 | 1 | 1 | 0 | 1 | 0 | 0 | 0 | 0 |
| 500 | 1 | 1 | 0 | 1 | 1 | 0 | 0 | 0 |
| 600 | 1 | 1 | 0 | 1 | 1 | 1 | 1 | 0 |
| 800 | 1 | 1 | 1 | 0 | 1 | 0 | 0 | 0 |
| 1000 | 1 | 1 | 1 | 1 | 0 | 0 | 0 | 0 |

TABLE 3

| F-number | Code | | | | | | | |
|---|---|---|---|---|---|---|---|---|
| | 7 | 6 | 5 | 4 | 3 | 2 | 1 | 0 |
| 1.2 | 0 | 0 | 0 | 0 | 1 | 0 | 0 | 0 |
| 1.4 | 0 | 0 | 0 | 1 | 0 | 0 | 0 | 0 |
| 1.8 | 0 | 0 | 0 | 1 | 1 | 0 | 0 | 0 |
| 2.0 | 0 | 0 | 1 | 0 | 0 | 0 | 0 | 0 |
| 2.4 | 0 | 0 | 1 | 0 | 1 | 0 | 0 | 0 |
| 2.8 | 0 | 0 | 1 | 1 | 0 | 0 | 0 | 0 |
| 3.3 | 0 | 0 | 1 | 1 | 1 | 0 | 0 | 0 |
| 4.0 | 0 | 1 | 0 | 0 | 0 | 0 | 0 | 0 |
| 4.8 | 0 | 1 | 0 | 0 | 1 | 0 | 0 | 0 |
| 5.6 | 0 | 1 | 0 | 1 | 0 | 0 | 0 | 0 |
| 6.7 | 0 | 1 | 0 | 1 | 1 | 0 | 0 | 0 |
| 8.0 | 0 | 1 | 1 | 0 | 0 | 0 | 0 | 0 |

TABLE 3-continued

| F-number | Code | | | | | | | |
|---|---|---|---|---|---|---|---|---|
| | 7 | 6 | 5 | 4 | 3 | 2 | 1 | 0 |
| 9.5 | 0 | 1 | 1 | 0 | 1 | 0 | 0 | 0 |
| 11 | 0 | 1 | 1 | 1 | 0 | 0 | 0 | 0 |
| 13 | 0 | 1 | 1 | 1 | 1 | 0 | 0 | 0 |
| 16 | 1 | 0 | 0 | 0 | 0 | 0 | 0 | 0 |
| 19 | 1 | 0 | 0 | 0 | 1 | 0 | 0 | 0 |
| 22 | 1 | 0 | 0 | 1 | 0 | 0 | 0 | 0 |
| 26 | 1 | 0 | 0 | 1 | 1 | 0 | 0 | 0 |
| 32 | 1 | 0 | 1 | 0 | 0 | 0 | 0 | 0 |

TABLE 4

| Shutter Speed Value | Code | | | | | | | |
|---|---|---|---|---|---|---|---|---|
| | 7 | 6 | 5 | 4 | 3 | 2 | 1 | 0 |
| 1 | 0 | 0 | 0 | 0 | 0 | 0 | 0 | 0 |
| 1.4 | 0 | 0 | 0 | 0 | 1 | 0 | 0 | 0 |
| 2 | 0 | 0 | 0 | 1 | 0 | 0 | 0 | 0 |
| 2.8 | 0 | 0 | 0 | 1 | 1 | 0 | 0 | 0 |
| 4 | 0 | 0 | 1 | 0 | 0 | 0 | 0 | 0 |
| 5.6 | 0 | 0 | 1 | 0 | 1 | 0 | 0 | 0 |
| 8 | 0 | 0 | 1 | 1 | 0 | 0 | 0 | 0 |
| 11 | 0 | 0 | 1 | 1 | 1 | 0 | 0 | 0 |
| 15 | 0 | 1 | 0 | 0 | 0 | 0 | 0 | 0 |
| 22 | 0 | 1 | 0 | 0 | 1 | 0 | 0 | 0 |
| 30 | 0 | 1 | 0 | 1 | 0 | 0 | 0 | 0 |
| 45 | 0 | 1 | 0 | 1 | 1 | 0 | 0 | 0 |
| 60 | 0 | 1 | 1 | 0 | 0 | 0 | 0 | 0 |
| 75 | 0 | 1 | 1 | 0 | 1 | 0 | 0 | 0 |
| 125 | 0 | 1 | 1 | 1 | 0 | 0 | 0 | 0 |
| 180 | 0 | 1 | 1 | 1 | 1 | 0 | 0 | 0 |
| 250 | 1 | 0 | 0 | 0 | 0 | 0 | 0 | 0 |
| 360 | 1 | 0 | 0 | 0 | 1 | 0 | 0 | 0 |
| 500 | 1 | 0 | 0 | 1 | 0 | 0 | 0 | 0 |
| 725 | 1 | 0 | 0 | 1 | 1 | 0 | 0 | 0 |
| 1000 | 1 | 0 | 1 | 0 | 0 | 0 | 0 | 0 |
| 1450 | 1 | 0 | 1 | 0 | 1 | 0 | 0 | 0 |
| 2000 | 1 | 0 | 1 | 1 | 0 | 0 | 0 | 0 |
| 2900 | 1 | 0 | 1 | 1 | 1 | 0 | 0 | 0 |
| 4000 | 1 | 1 | 0 | 0 | 0 | 0 | 0 | 0 |

Table 1 shows lens names representing the types of lenses, and discrimination codes thereof. The discrimination code is represented by 8-bit data. For example, a lens of a focal length of 50 mm and a full-aperture f-number F1.8 is represented by discrimination code 01 (this code is represented by the hexadecimal notation, and the hexadecimal notation will be indicated by (H) hereinafter). A zoom lens of a focal length of 35–105 mm and a full-aperture f-number F3.3 to F4 is represented by discrimination code 06(H).

Table 2 is a code table showing the focal lengths of the lenses. For example, a focal length of 20 mm is represented by code "01101000" (68 by hexadecimal notation), a focal length of 180 mm is represented by code "10110100" (B4 by hexadecimal notation).

Table 3 is a code table showing lens aperture values represented by f-numbers. For example, an aperture value corresponding to f-number F1.4 is represented by code "00010000" (10 by hexadecimal notation), and an aperture value corresponding to f-number F11 is represented by code "01110000" (70 by hexadecimal notation).

Table 4 is a code table showing shutter speeds. For example, a shutter speed value "60" representing 1/60 sec is represented by code "01100000", and a shutter speed value "250" representing 1/250 sec is represented by code "10000000".

Figures 2, 3:
FIGS. 2 and 3 show respective parts of contents of a memory of the invention.

FIG. 2 shows a state wherein five data sets, each consisting of a focal length code and a full-aperture f-number code (corresponding to the aperture value codes of the lenses shown in Table 3 in the following description) as peculiar data, and a lens discrimination code corresponding to the peculiar data, are stored in a memory table of the nonvolatile memory 15. Each address indicates a 1-byte memory area in the memory table of the nonvolatile memory 15.

Discrimination codes of the lenses are stored at addresses 000, 002, 004, 006 and 008. Data "1" indicating a single lens or data "0" indicating a zoom lens is stored at the most significant bits (MSB) of addresses 000, 002, 004, 006 and 008. New Discrimination codes which are not stored at addresses 000, 002, 004, 006, and 008 can be additionally stored at every other address from address 00A.

A discrimination code 01(H) representing a lens of a focal length of 50 mm and a full-aperture f-number F1.8 is stored at address 000. A discrimination code 09(H) representing a lens of a focal length of 28 mm and a full-aperture f-number F2.8 is stored at address 002. A discrimination code 06(H) representing a zoom lens of a focal length of 35-105 mm and a full-aperture f-number F3.3-4 and data of most significant bit "1" representing the zoom lens are stored at address 004. A discrimination code 03(H) representing a lens of a focal length of 135 mm and a full-aperture f-number F2.8 is stored at address 006.

Reference address information for referring to the focal length codes and the full-aperture f-number codes represented by the discrimination codes stored at addresses 000, 002, 004, 006, and 008 are stored at addresses 001, 003, 005, 007, and 009, respectively. New reference codes which are not stored at addresses 001, 003, 005, 007 and 009 can be stored at every other address from address 009.

More specifically, reference address information 40(H) representing address 040 is stored at address 001. Reference address information 42(H) representing address 042 is stored at address 003. Reference address information 44(H) representing address 044 is stored at address 005. Reference address information 48(H) representing address 048 is stored at address 007. Reference address information 4A(H) representing address 04A is stored at address 009.

Focal length codes shown in Table 2 are stored at addresses 040, 042, 044, 046, and 04A. Full-aperture f-number codes shown in Table 3 are stored at addresses 041, 043, 045, 047, 049, and 04B.

A code 88(H) representing a focal length code "10001000" (focal length of 50 mm) of a lens represented by a discrimination code 01 at address 000 is stored at address 040. A code 18(H) representing a full-aperture f-number code "00011000" (F1.8) of the above lens is stored at address 041.

A code 74(H) representing a focal length code "01110100" of the lens represented by a discrimination code 09 at address 002 is stored at address 042, and a code 30(H) representing a full-aperture f-number code "00110000" (F2.8) of the above lens is stored at address 043.

Peculiar data of a zoom lens represented by a discrimination code 06 at address 004 is stored in a 4-byte memory area allocated at addresses 044 to 047. More specifically, a code 7C(H) representing a focal length code "01110100" (focal length of 35 mm) of one of the two focal lengths is stored at address 044. A code A2(H) representing the other focal length code "10100000" (focal length of 105 mm) is stored at address 046. A code 38(H) representing a full-aperture f-number code "00111000" (F3.3) of one of the two full-aperture f-numbers is stored at address 045, and a code 40(H) representing the other full-aperture f-number code "01000000" (F4.0) is stored at address 047.

A code AA(H) representing a focal length code "10101010" (focal length of 135 mm) of a lens represented by a discrimination code 03 at address 006 is stored at address 048, and a code 30(H) representing a full-aperture f-number code "00110000" (F2.8) of the above lens is stored at address 049.

A code C6(H) representing a focal length code "11000110" (focal length of 300 mm) of a lens represented by a discrimination code 0B at address 008 is stored at address 04A, and a code 30(H) representing a full-aperture f-number code "00110000" (F2.8) of the lens is stored at address 04B.

Focal length codes of lenses represented by the new discrimination codes can be correspondingly stored at every other address starting from address 04C. Full-aperture f-number codes of the lenses represented by the new discrimination codes can be correspondingly stored at every other address starting from address 04D.

The control section in the CPU 11 of the camera body 10 includes the memory control means for sequentially storing photograph data and discrimination code of the lens used for each photograph frame from the first frame in a memory area starting from address 100 in the memory table of the nonvolatile memory 15. In this case, the memory control means can store photograph data and the discrimination code of the lens used in synchronism with a shutter release operation, a film wind-up operation, or other photographing operations. The memory control means uses a 6-byte memory area per frame for storing data for each photograph frame in the non-volatile memory 15. Of the 6-byte memory area, a 5-byte memory area stores the photograph data, and the remaining 1-byte memory area stores the discrimination code of the lens.

In this embodiment, photographing date, a shutter speed value, and an aperture value can be stored as the photograph data.

The memory control means compares the discrimination data or peculiar data of the attached interchangeable lens 20 with the discrimination data or peculiar data of data sets prestored in the nonvolatile memory 15. When the discrimination data or peculiar data of the attached interchangeable lens 20 is not stored in the nonvolatile memory 15, the memory control means stores a set of data consisting of discrimination data and peculiar data of the attached interchangeable lens 20 in the non-volatile memory.

Figure 4:
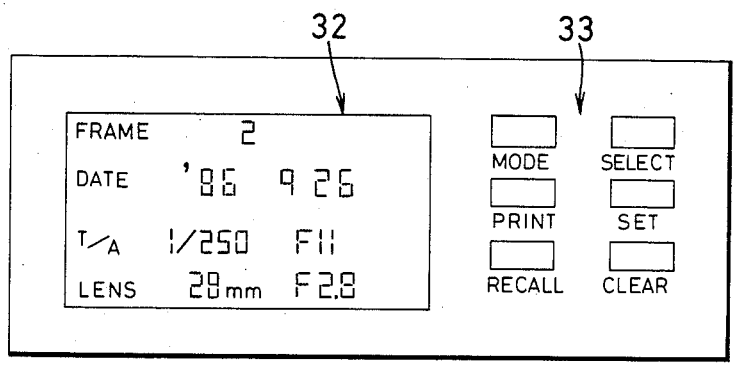
FIG. 4 shows display and a key board of the invention.

As shown in FIG. 4, the display 32 displays the number of photographed frames on the first line, a photographing date on the second line, a shutter speed value and an aperture value (f-number) on the third line, and information of the used lens on the fourth line, respectively. A switch indicated by "RECALL" of the keyboard 33 is adapted to cause the display 32 to output the photograph data. The switch "RECALL" has a function for displaying the stored photograph data contents frame by frame.

The operation will be described below.
(1) The general operation, with respect to data that is stored in the memory area starting from address 100 of the memory table of the nonvolatile memory 15, by the memory control means will be described with reference to the flow chart shown in FIG. 5.

Figure 5:
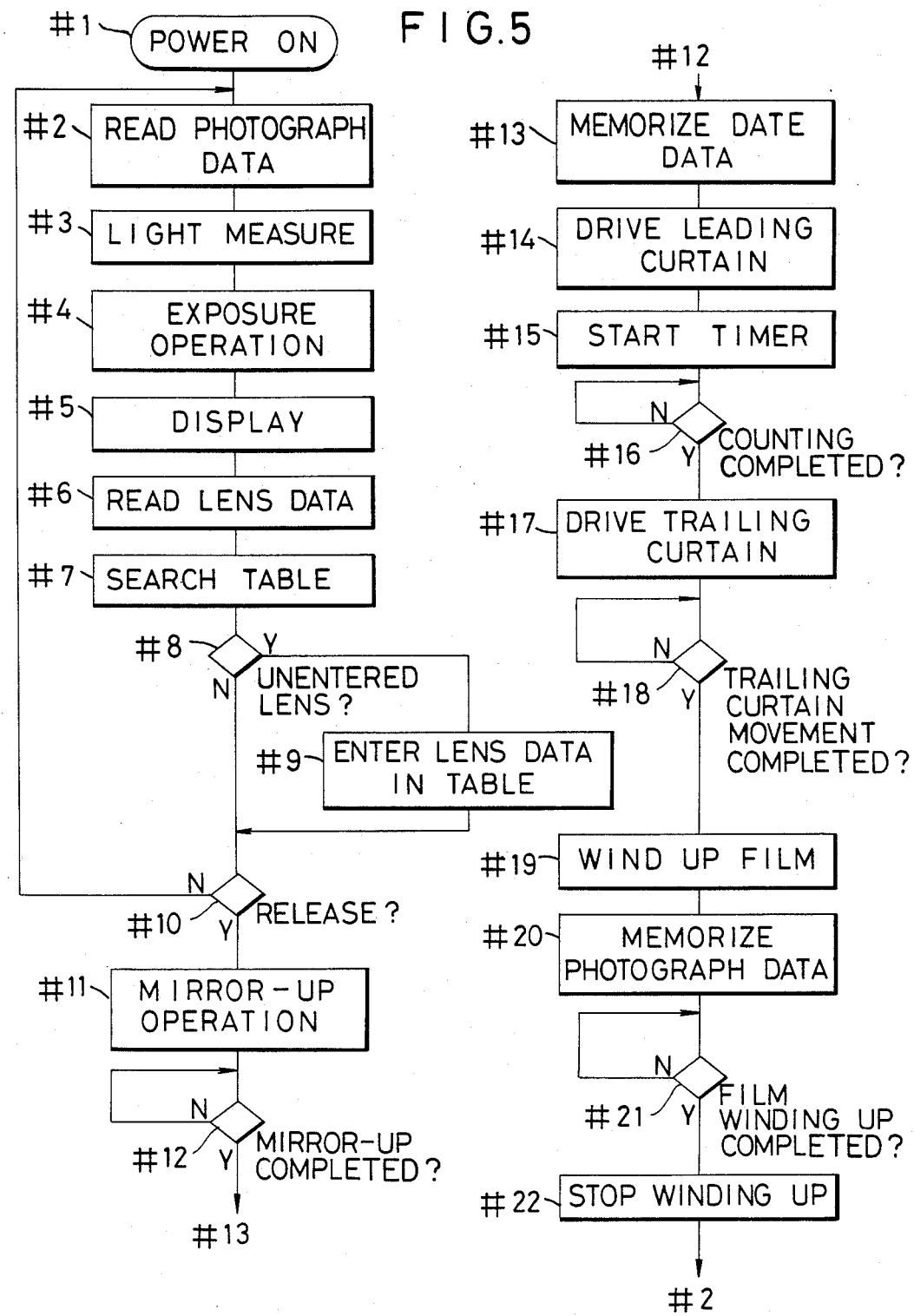
FIGS. 5 and 6 are flow charts, each showing a part of operation of the invention.

As shown in FIG. 5, when a power source of the camera body 10 is turned on (#1), CPU 11 reads photograph data such as a film speed, a shutter speed value, a photographing mode, and the like, set by the photograph information setting part 12, and stores it in its internal memory (#2). A luminance of an object is measured by a light-receiving element (not shown) (#3), and the CPU 11 performs an exposure operation based on the photograph data and the measured luminance, so that a value of the aperture driven by the driving part 14 and a shutter speed are calculated (#4). The calculated data is displayed on the display 13 of the camera body 10 (#5).

The CPU 11 communicates with the CPU 21 of the interchangeable lens 20 attached to the camera body 10 and reads lens data (discrimination code, focal length code and full aperture f-number code of the lens) of the interchangeable lens 20 through the connecting means 41 (#6).

The comparison means compares the discrimination code of the attached interchangeable lens 20 and the content stored in the memory table of the nonvolatile memory 15 (#7) so as to check whether or not the attached lens is an unentered lens (#8). If the attached lens is an unentered lens, the discrimination code, the focal length code, and the full-aperture f-number code of the lens are entered in the memory table (#9). The state of the release switch is then read. If the release switch is OFF, the above operations are repeated (#10). If the release switch is ON, the flow enters the release routine (#10).

In the release routine, a mirror-up operation is initiated (#11). The CPU 11 awaits the completion of the mirror-up operation (#12). Therefore, date data representing a photographing date from a time generation device (not shown) arranged in the data back 30 is temporarily stored (#13). Since the camera of the present invention is a single-lens reflex camera, a mirror for observation through a finder is used. Then, a shutter leading curtain is driven (#14), and an internal timer of the CPU 11 is caused to start measuring a preset shutter speed (#15). Upon completion of the measurement, a shutter trailing curtain is driven (#17).

When driving of the shutter trailing curtain is completed (#18), the film wind-up operation is initiated (#19). Photograph data such as a photographing date, a shutter speed code, an aperture value code, and a discrimination code of the lens are stored in the memory table of the nonvolatile memory 15, as shown in FIG. 3 (#20).

If it is detected that the film wind-up operation is completed (#21), the film wind-up operation is stopped (#22), and the flow returns to step #2.

With the above operation (#20), as shown in FIG. 3, the photograph data for the first frame can be stored in the memory area allocated at addresses 100 to 105 of the memory table of the nonvolatile memory 15. The photograph data for the second frame is stored in the memory area allocated from addresses 106 to 10B of the memory table. The photograph data for the third frame is stored in the memory area (#20) allocated from addresses 10C to 111 of the memory table.

More specifically, as the photograph data for the first frame, date data "Sept. 25, '86" is stored at addresses 100 to 102 in the form of a BCD code, a code 70(H) representing a shutter speed "1/125 sec" (see Table 4) is stored at address 103, a code 50(H) representing an aperture value corresponding to an f-number "F5.6" (see Table 3) is stored at address 104, and a discrimination code 01(H) of a lens representing an interchangeable lens of 50 mm and F1.8 (see Table 1) is stored at address 105.

As the photograph data for the second frame, date data "Sept. 26, '86" is stored at addresses 106 to 108 in the form of the BCD code, a code 80(H) representing a shutter speed "1/250 sec" is stored at address 109, a code 70(H) representing an aperture value corresponding to an f-number "F11" is stored at address 10A, and a discrimination code 09(H) representing an interchangeable lens of 28 mm and F2.8 is stored at address 10B.

As the photograph data for the third frame, date data "Sept. 26, '86" is stored at addresses 10C to 10E in the form of the BCD code, a code 90(H) representing a shutter speed "1/500 sec" is stored at address 10F, a code 40(H) representing an aperture value corresponding to an f-number "F4" is stored at address 110, and a discrimination code 0B(H) representing an interchangeable lens of 300 mm and F2.8 is stored at address 111.

The photograph data for the fourth frame can be similarly stored in a 6-byte memory area from address 112. As shown in FIG. 3, data representing address 112 for storing the photograph data for the next frame is stored at addresses 3FE and 3FF of the memory table of the nonvolatile memory 15.

As can be seen from the above description, when the photograph data is stored for every photograph frame, only a 1-byte memory area is required for storing a lens discrimination code. Therefore, a memory area necessary for each photograph frame can be reduced, and data for a large number of photograph frames can be stored in the limited memory table of the nonvolatile memory 15.

Figure 6:
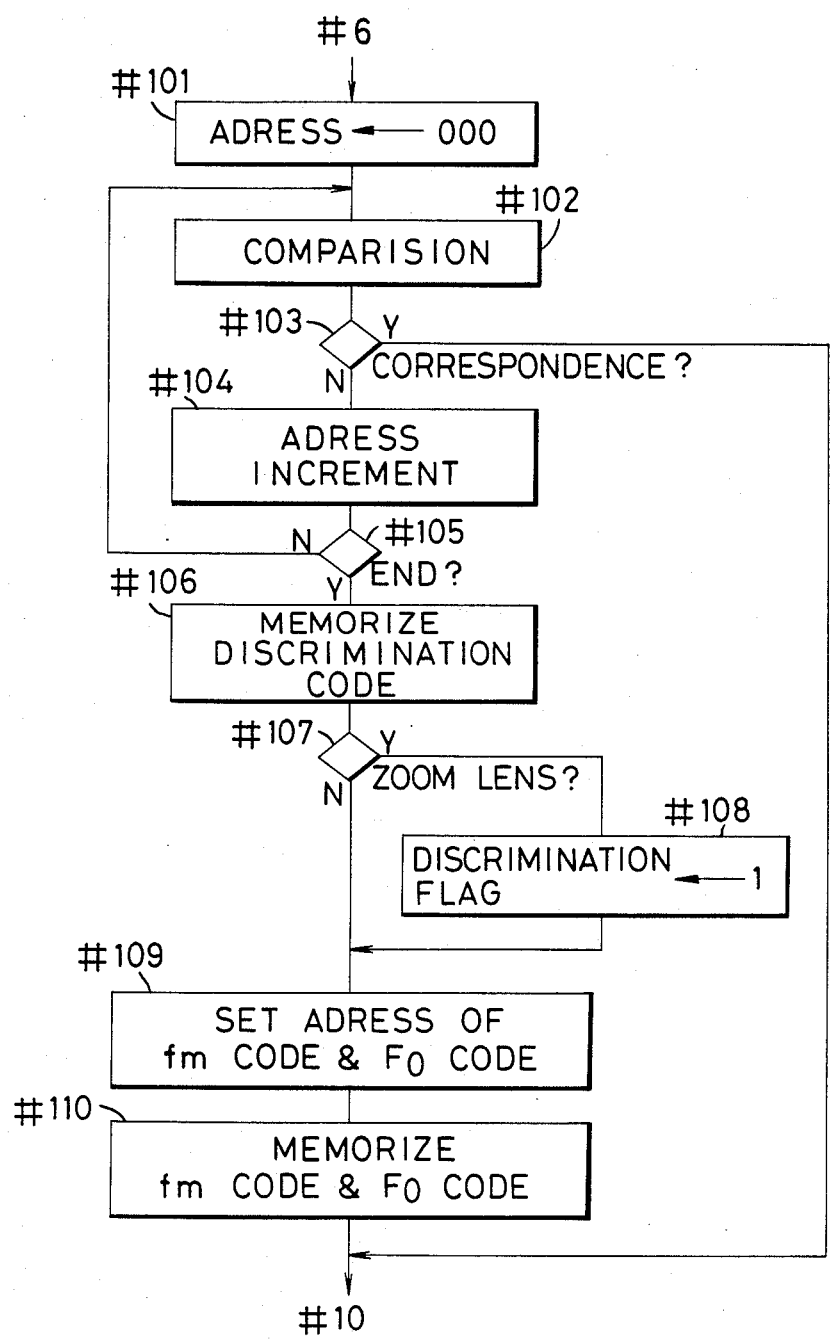

(2) The operation for additionally storing unentered lens data in the memory table of the nonvolatile memory 15 will be described with reference to the flow chart shown in FIG. 6. The flow chart in FIG. 6 shows in detail steps #7 to #9 in the flow chart shown in FIG. 5.

After the lens data of the interchangeable lens 20 attached to the camera body 10 is read in step #6, the addresses of the memory table of the nonvolatile memory 15 storing the discrimination codes of various interchangeable lenses are set (#101). In this case, address 000 of the memory table is first set, and table data at address 000 is compared with the discrimination code of the attached interchangeable lens 20 (#102) to check if a correspondence is found therebetween (#103). If the correspondence is found therebetween, the flow advances to step #10. If no correspondence is found, the address of the memory table is incremented by two (#104) to check if data is stored at the incremented address, i.e., if data of the memory table is ended (#105). If the data is not ended, the flow returns to step #102, and the above operation is repeated.

If it is determined that the data is ended, the discrimination code of the interchangeable lens 20 is memorized at the incremented address (#106). Then, it is checked if the interchangeable lens 20 is a zoom lens (#107). If the lens 20 is determined to be a zoom lens, a discrimination flag "1" for a zoom lens is set in the most significant bit of the memory area at the address at which a new discrimination code is stored (#108). If the lens 20 is determined not to be a zoom lens, the discrimination flag for a single lens set at the most significant bit of the memory area remains "0".

Addresses of the memory table are set (#109) at which the focal length code and the full-aperture f-number code of the interchangeable lens 20 are stored. The focal length code (to be referred to as an fm code hereinafter) and the full-aperture f-number code (to be referred to as an F0 code hereinafter) are memorized in the memory area at the corresponding addresses (#110). Reference address information is stored at an address of the memory area at which the discrimination code is additionally stored in step (#106), thereby referring to the addresses of the memory area which store the fm and F0 codes.

The operation for additionally storing the unentered lens data in the memory table as described above will be described in more detail with reference to FIG. 2.

In FIG. 2, four sets of data for four interchangeable lenses (50 mm, F1.8 lenses; 28 mm, F2.8 lens; 35-135 mm, F3.3-4 lens; and 135 mm, F2.8 lens) are already stored in the memory table of the nonvolatile memory 15.

If a new 300 mm, F2.8 interchangeable lens is attached to the camera body 10, the CPU 11 fetches data (discrimination code 0B(H), an fm code C6(H), and an F0 code 30(H) of the interchangeable lens from the CPU 21.

It is checked if the data of the interchangeable lens has already been entered in the memory table of the nonvolatile memory 15. More specifically, the discrimination code 0B(H) of the lens is sequentially compared with the contents at addresses 000, 002, 004, and 006. Since codes 01(H), 09(H), 06(H), and 03(H) are respectively stored at addresses 000, 002, 004, and 006, no data that can correspond or coincide with the discrimination code 0B(H) is stored. Therefore, the discrimination code 0B(H) is newly stored at address 008.

At this time, a discrimination flag "0" of a single lens is set at the most significant bit of the memory area at address 008. An fm code C6(H) representing the focal length "300 mm" is stored at address 04A, and an F0 code 30(H) representing the full-aperture f-number F2.8 is stored at address 04B. Reference address data for referring to the fm code C6(H) is stored at address 009.

According to this embodiment, since the unentered lens data can be additionally stored in the memory table of the nonvolatile memory 15, as described above, a plurality of sets of data for a plurality of types of interchangeable lenses need not be prestored in the memory table. When an interchangeabale lens whose data is unentered is used, the camera can automatically and additionally store the unentered data by the memory control means. Therefore, when a camera is introduced in the market, if no data of interchangeable lenses is stored in the memory table of nonvolatile memory 15, the camera system can be operated.

(3) A display operation of the photograph data on a display will be described with reference to photograph data for the second frame stored at addresses 106 to 10B of the nonvolatile memory 15 in conjunction with FIG. 4.

As shown in FIG. 4, numeral "2" indicating the second frame is displayed on the first line of the display 32 of the data back 30.

Date data stored at addresses 106 to 108 is displayed on the second line of the display 32 without modification.

The code 80(H) of the shutter speed stored at address 109 and the code 70(H) of the aperture value stored at address 10A are converted to normal expressions using a reference table (not shown) or by arithmetic operations. Thus, "1/250" as the shutter speed and "F11" as the f-number corresponding to the aperture value are displayed on the third line of the display 32.

When the type of the interchangeable lens used in the photographing operation for the second frame is displayed, the discrimination code 09(H) stored at address 10B is sequentially compared with the lens discrimination codes stored on the memory table of the nonvolatile memory 15 shown in FIG. 2 from address 000, thereby retrieving address 002 having the same storage content as the discrimination code 09(H). The reference address information 42 for referring to the fm code and the F0 code of the lens represented by the discrimination code 09(H) is stored at address 003 next to address 002. The fm code 74(H) is stored at address 042 indicated by the reference address information 42 and the F0 code 30(H) is stored at next address 043.

In this manner, the fm code 74(H) and the F0 code 30(H) which correspond to the discrimination code 09(H) are read out, and are converted to normal expressions using the reference table (not shown) or by arithmetic operations. Thus, "28 mm" representing the focal length of the interchangeable lens and "F11" representing the full-aperture f-number are displayed on the fourth line of the display 32.

In the above embodiment, the case has been described wherein the present invention is applied to an interchangeable lens as a camera accessory, and peculiar data and discrimination data are stored. The present invention can also be applied to accessories such as a "speed light" used in the camera system, to store its guide number or its model number.

In the above embodiment, the nonvolatile memory 15 is arranged in the camera body 10 as memory means, and a focal length code, a full-aperture f-number code, a discrimination code, and the like, of the interchangeable lens as a camera accessory are stored in the nonvolatile memory 15. The memory means may be arranged in the data back 30.

A total number of photographed film cartridges read by the CPU 31 is printed in the last frame in the initial advance of the currently used cartridge by the printing part 34. The initial advance is defined as an operation for winding up a predetermined number of leading frames when the film leading portion is subjected to exposure upon film cartridge loading. After the initial advance is completed, normal photographing can be performed.

Figure 7:
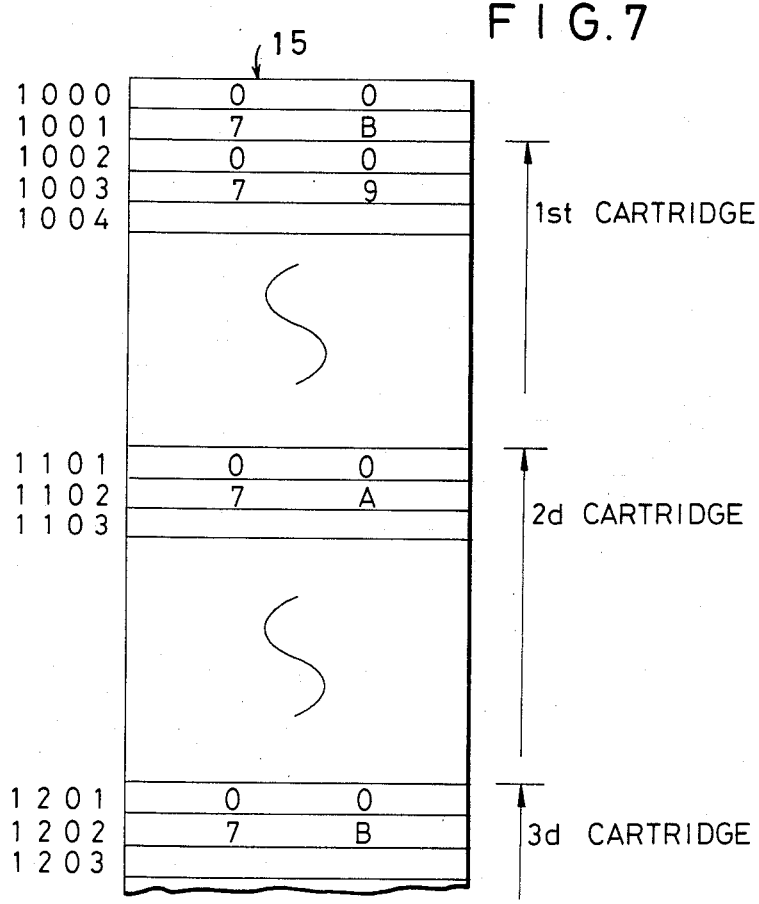
FIG. 7 shows a part of contents of a memory of the invention.

A case will be described with reference to FIG. 7 wherein the nonvolatile memory 15 stores photograph data for three film cartridges. FIG. 7 shows a partial memory map of the nonvolatile memory 15.

As shown in FIG. 7, a total film number code 007B (hexadecimal notation) representing the total number "123" for a currently used film cartride as the 123rd cartridge is stored at addresses 1000 and 1001 in the memory area of the nonvolatile memory 15. A total film number code 0079(H) representing the total number "121" for a first cartridge as the 121st photographed cartridge is stored at addresses 1002 and 1003. The actual photograph data for the first film cartridge is sequentially stored for each photograph frame at address 1004 and subsequent addresses.

A total film number code 007A(H) representing the total number "122" for a second cartridge as the 122nd photographed cartridge is stored at addresses 1101 and 1102. At address 1103 and subsequent addresses, actual photograph data for the second film cartridge is stored for each photograph frame.

Similarly, a total film number code 007B(H) representing the total number "123" for the third cartridge as the above-mentioned currently used cartridge is stored at addresses 1201 and 1202. At address 1203 and subsequent addresses, actual photograph data for the third film cartridge is sequentially stored for each photograph frame.

Figures 8, 9:
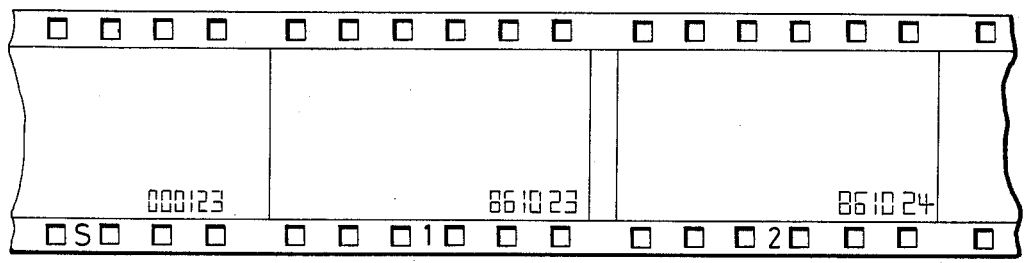
FIGS. 8 and 9 are explanatory views showing photographing operation of the invention.

A printing operation for printing the total number of photographed film cartridges stored in the nonvolatile memory 15 onto a film will now be described with reference to FIG. 8. FIG. 8 exemplifies the third film cartridge.

The total number photographed number code 007B(H) representing the total number "123" for the third film cartridge is read by the CPU 31 through the CPU 11 and the connecting means 42, and is converted to a display "000123" in decimal notation. The film number "123" of the film cartridge is printed on the last frame(frame "S") in the initial advance by the printing part 34. As shown in FIG. 8, the photographing operations up to the second frame are completed in the third film cartridge, and date data are respectively printed as the photograph data on the first and second frames by the printing part 34.

A case will be described with reference to FIG. 9 wherein photograph data of the third film cartridge stored in the nonvolatile memory 15 is printed out by a printer (not shown).

As shown in FIG. 9, as photograph data printed out by the printer, letters "FILM NO." and numerals "000123" indicating the total number of previous and current film cartridges are printed on the first line. On the second line, numeral "1" representing the first frame, and photograph data (data, time, shutter speed, f-number as aperture value, and photograph mode) are printed. Similarly, on the third line, numeral "2" indicating the second frame, and the photogaph data similar to the first frame are printed.

The photograph data of the film cartridge can be displayed on display 32 without being printed out.

The operation for printing the total number of film cartridges stored in the nonvolatile memory 15 (in this case, "000123") on the last frame (frame "S") in the initial advance as shown in FIG. 8, will be described with reference to the flow chart shown in FIG. 10.

Figure 10:
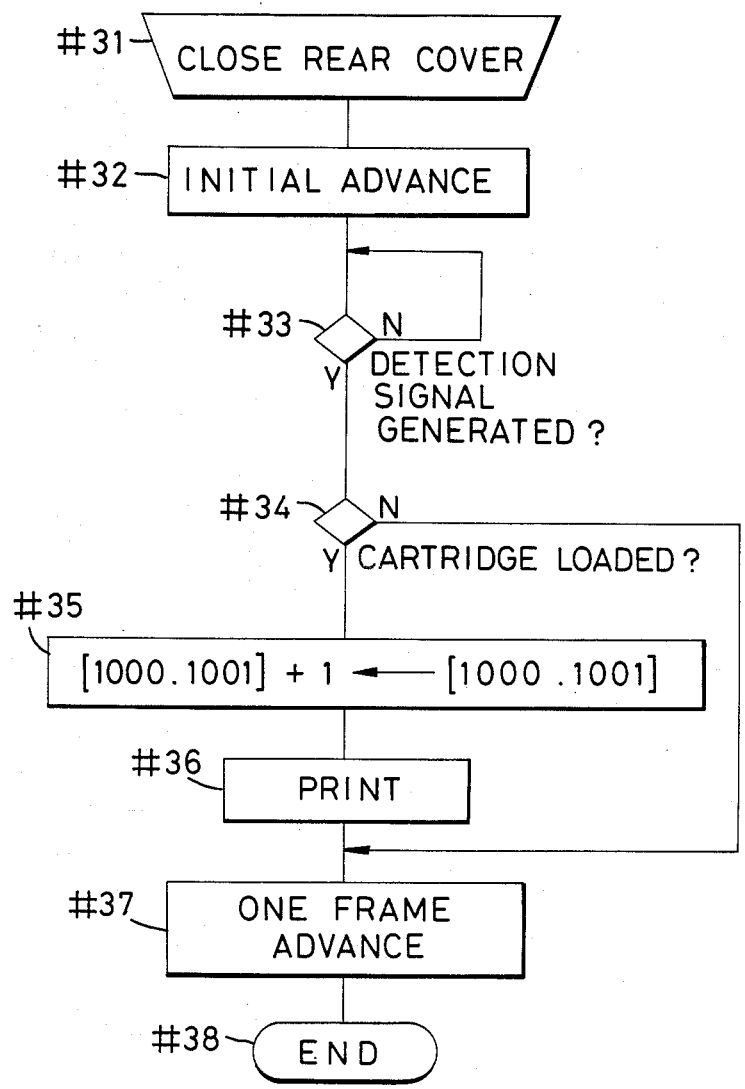
FIG. 10 is a flow chart showing a part of operation of the invention.

As shown in FIG. 10, when a rear cover which is closed after a film cartirdge is loaded into the camera body 10 is closed (#31), the initial advance operation of the film is started (#32). The detector 17 detects that the film is initially advanced to a last frame (frame "S") in the initial advance, i.e., a frame immediately preceding the first frame, and generates a detection signal. The CPU 11 checks if the detection signal is generated (#33). If the film is initially advanced to the frame "S", it checks from the enabled state of the switch 18 if the cartridge is loaded (#34). If the cartridge is loaded, the content (1000,1001) of addresses 1000 and 1001 of the memory 15 representing the total number of cartridges is incremented by +1 (#35), and the incremented total number is printed by the printing part 34. Thereafter, the film is advanced by one frame (#37). In this manner, the film initial advance operation is completed (#38).

In the case of a camera which does not perform an initial advance operation, the switch 18 can be omitted.

The film discrimination data is not limited to the total number of cartridges. For example, it can be date data upon initial advance or photograph data that can be manually set.

According to this embodiment, since the film discrimination data corresponds to the total number of cartridges, a user can always know the total number of cartridges photographed by his own camera, and hence, conveniently periodical maintenance timing for the camera.

In this embodiment, the total number of film cartridges is printed on the last frame (frame "S") in the initial advance. However, the present invention is not limited to this. For example, if a user wonders whether or not the total number of film cartridges can be reliably printed on the last frame (frame "S") of the initially advanced frames of the film, the total number can be printed on a film at a position at which the data can be reliably printed, and then, the film is advanced by one frame. Thereafter, the initial advance operation can be stopped.

If the film discrimination data printed on a film is different from that printed on other films and corresponds to that stored in the nonvolatile memory 15, the same data as that stored in the memory 15 need not always be printed.

With the above arrangement, when storage data is displayed or printed after the photographing operations for a plurality of film cartridges are completed, the displayed or printed photograph data can reliably and conveniently correspond to the photographed films.

Figure 11:
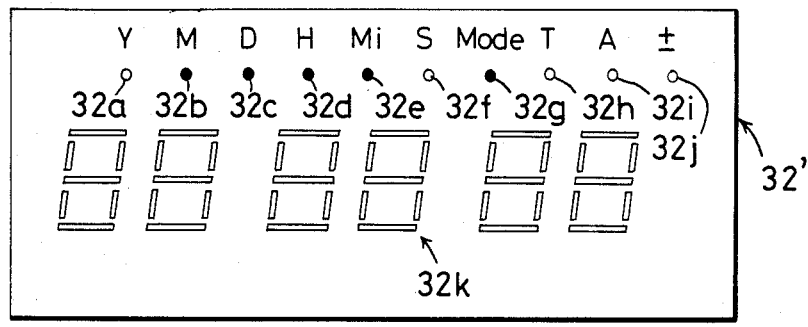
FIG. 11 is a view showing an improved embodiment of the invention.

A partial improvement of the embodiment of the present invention will be described below. As shown in FIG. 11, a display 32' is arranged in place of the display 32. On the display 32', symbols Y to ± indicate items of photograph data, indication lamps 32a to 32j respectively correspond to symbols Y to ±, and liquid-crystal display part 32k are provided. In addition, a keyboard 33' shown in FIG. 12 is provided in place of the keyboard 33 shown in FIG. 4.

The indication lamps 32a to 32j indicate by a turn-off state (indicated by hollow circles in FIG. 11) that a selection is made by the keyboard 33' not to store photograph data of the corresponding items, by a turn-on state (indicated by black circles in FIG. 11) that a selection is made by the keyboard 33' to store the photograph data of the corresponding items, and by a flashing state that a selection is being made by the keyboard 33' whether or not the photograph data of the corresponding items is to be stored.

The symbols Y, M, D, H, Mi, S, Mode, T, A, and ± respectively represent year, month, day, hour, minute, second, photographing mode, shutter speed, aperture value, and exposure correction value.

Figure 12:
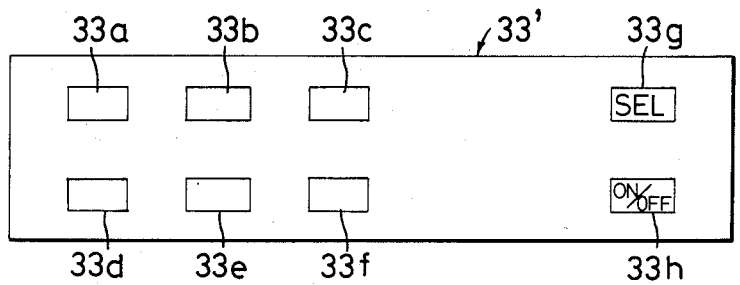
FIG. 12 shows a keyboard of the improved embodiment.

As shown in FIG. 12, the keybord 33' comprises switches 33a to 33f for inputting various types of information, a first selection switch 33g for selecting an item of photograph data to be stored, and a second selection switch 33h for selecting whether or not the photograph data of the item selected by the first selection switch 33g is to be stored.

The relationship between the keyboard 33', the display 32' and the CPU 31 is that each time the first selection switch 33g is depressed, the items of the photograph data are selected in the order of Y, M, D, ..., and one indication lamp (32a to 32j) corresponding to the selected item flashes. When the photograph data of the item corresponding to the flashing indication lamp is to be stored, the second selection switch 33h is depressed to keep the flashing indication lamp ON. When the photograph data of the item corresponding to one flashing indication lamp is not to be stored, the second selection switch 33h is depressed to turn off the flashing indication lamp.

The keyboard 33' is means for manually selecting the items of photograph data stored in the nonvolatile memory 15 as the memory means.

The operation of the camera system having the above arrangement will now be described.

As shown in FIG. 11, since five indication lamps 32b, 32c, 32d, 32e and 32g of the display 32' are turned on, selections are made by the keyboard 33' so that 5 items of the photograph data represented by the letters M, D, H, Mi and Mode respectively corresponding to the indication lamps 32b, 32c, 32d, 32e k and 32g (month, day, hour, minute, and photographing mode data) are stored upon photographing.

Figure 13:
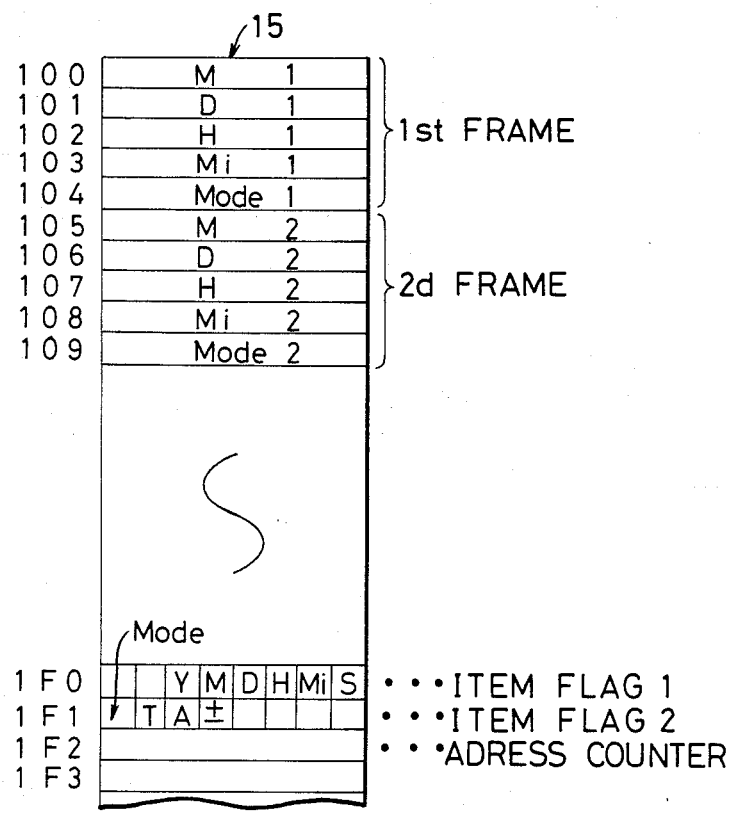
FIG. 13 shows contents of a memory of the improved embodiment.

FIG. 13 illustrates a memory map of the non-volatile memory 15 in which photograph data is stored when the first to fifth frames are photographed while selections are made to store 5 items of photograph data upon photographing, as shown in FIG. 11.

More specifically, photograph data for the first frame is stored in a memory area allocated at addresses 100 to 104 of the nonvolatile memory 15. Similarly, photograph data for the second, third, . . . , sixth frames are stored in the memory areas at addresses 105 to 109, addresses 10A to 10E, . . . , addresses 119 to 11D, respectively. In the contents of photograph data stored in the memory areas at addresses 100 to 11D, numerals represent the number of frames, and letters represent the items of photograph data in the same manner as letters in FIG. 11.

A memory item flag 1, corresponding to the items which are selected by the keyboard 33' to be stored from the year, month, date, hour, minute and second data sent from the data back 30, is set in a memory area at address 1F0 of the nonvolatile memory 15 shown in FIG. 13. Similarly, a memory item flag 2, corresponding to the items which are selected by the keyboard 33' to be stored from photograph data set or controlled by the camera body 10, is set in a memory area at address 1F1.

In the case of FIGS. 11 and 13, since 5 items of photograph data indicated by symbols M, D, H, Mi and Mode are selected by the keyboard 33', data "xx011110" ("x" means not determined) is set as the memory item flag 1 in the memory area at address 1F0, and data "1000xxxx" is set as the memory item flag 2 in the memory area at address 1F1.

As for the memory area at address 1F0, data "0" is set in bits corresponding to symbols Y and S, and data "1" is set in bits corresponding to symbols M, D, H and Mi. As for the memory area at address 1F0, data "1" is set at a bit corresponding to symbols Mode, and data "0" are set in bits corresponding to symbols T, A and ±.

A memory area at address 1F2 stores an address counter representing addresses of the memory areas in which photograph data is stored. Each time an item of photograph data is stored, the content of the address counter is incremented by one.

In the state shown in FIG. 11, when photograph data of an item indicated by symbol Y is to be additionally stored as a memory item, the first selection switch 33g is depressed so as to flash the lamp 32a corresponding to symbol Y. In this state, the second selection switch 33h is depressed to turn on the lamp 32a. In the state shown in FIG. 11, when photograph data of an item indicated by symbol Mode is to be cleared from the memory items, the first selection switch 33g is depressed to flash the lamp 32g corresponding to symbol Mode. In this state, the second selection switch 33h is depressed to turn on the lamp 32g. The generation operation of the camera system will be described with reference to the flow chart shown in FIG. 14.

Figure 14:
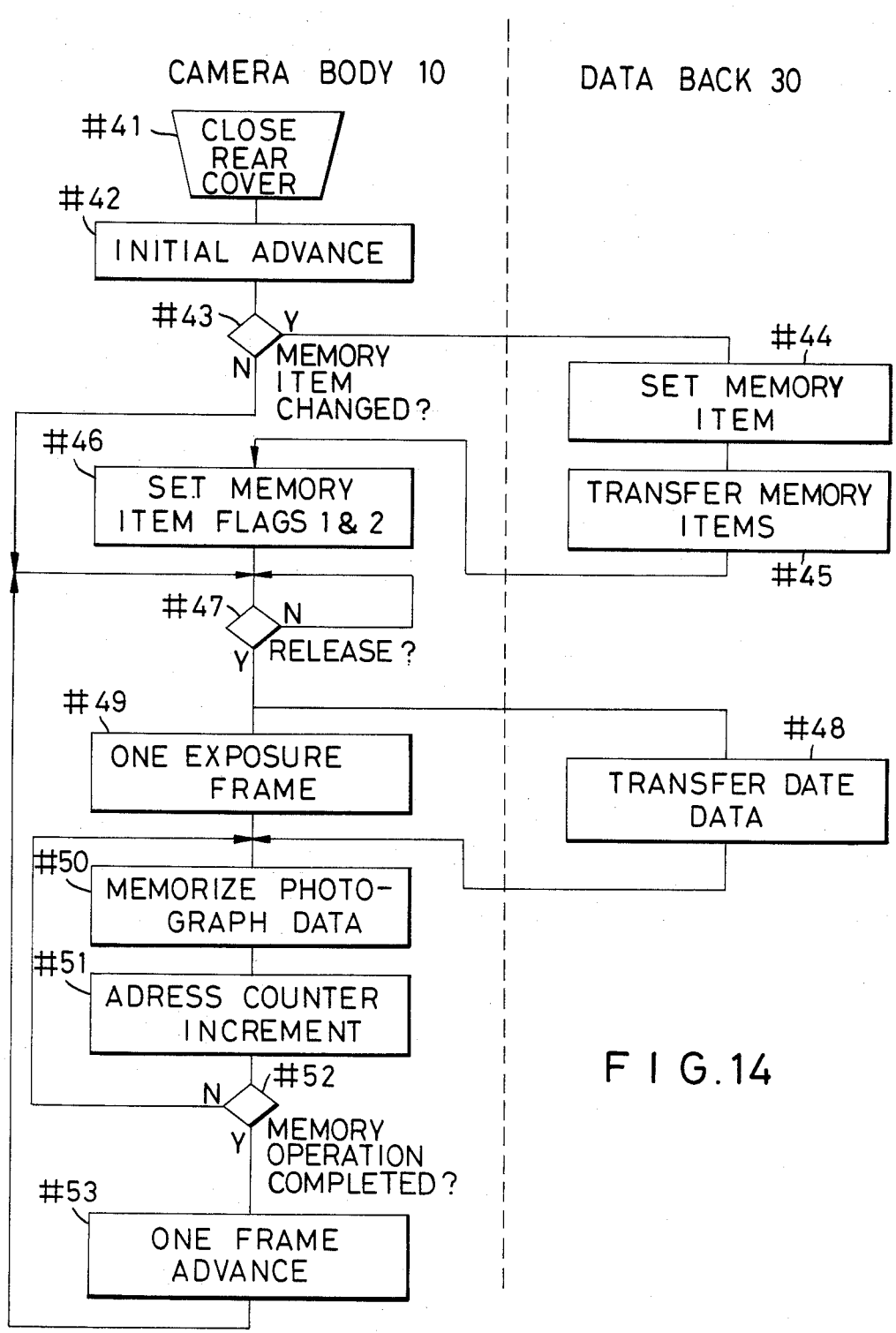
FIG. 14 is a view showing operation of the improved embodiment.

As shown in FIG. 14, when the rear cover is closed (#41), the initial advance operation of the film is started (#42). It is checked in step #43 if memory items can remain the same as those in the immediately preceding film cartridge. If the memory items are to be changed, a memory item of photograph data is set by the keyboard 33' of the data back 30 (#44). After the setting operation, the new memory item information is transferred to the CPU 11 of the camera body 10 through the connecting means 42 (#45), and the CPU 11 sets memory item flags 1 and 2 at addresses 1F0 and 1F1 in accordance with the memory item information transferred from the data back 30 (#46).

When the release switch is turned on in this state (#47) and the camera is set in a normal photographing state, an operation signal is transferred from the CPU 11 to the CPU 31, and photograph data of a date at that time is stored in the CPU 31 (#48). Upon completion of an exposure operation of the first frame (#49), the date data stored in the CPU 31 is transferred to the CPU 11 (#48).

Of the date data transferred from the data back 30 and photograph data set by the camera body 10, such as a shutter speed, aperture value, photographing mode, and exposure correction value, data corresponding to the memory items selected by the keyboard 33' is stored in accordance with the memory item flags 1 and 2 (#50). Each time one item of photograph data is stored, the content of the address counter is incremented by one (#51).

The operations of steps #50 and #51 are repeated until the all the selected memory items are stored. Upon completion of the memory operation (#52), the camera performs another processing as needed (#53), and accepts the next release operation.

Another improvement of the present invention will be described with reference to Table 5 and FIG. 15.

In FIG. 13, one item of photograph data is stored in a 1-byte memory area of the nonvolatile memory 15. In this improvement in order to effectively use the memory areas of the nonvolatile memory 15, photograph data of the respective items are stored without providing an empty area between adjacent data.

TABLE 5

| Item | Range | Required Number Of Bits |
| --- | --- | --- |
| Year | 00–99 | 7 |
| Month | 1–12 | 4 |
| Day | 1–31 | 5 |
| Hour | 1–24 | 5 |
| Minute | 0–59 | 6 |
| Second | 0–59 | 6 |
| Photographing Mode | A,S,M,P . . . | 2–3 |
| Shutter | B, 4–1/4000 | 4 |
| F-number | 1–32 | 4 |
| Exposure Correction | ±2½ steps | 4 |

As shown in Table 5, the respective items of photograph data require different numbers of bits necessary for their memory operations. For example, the content of "Month" is "1-12", and the number of bits necessary for its memory operation is 4. The content of "Minute" is "0-59", and the number of bits necessary for the memory operation is 6.

Figure 15:
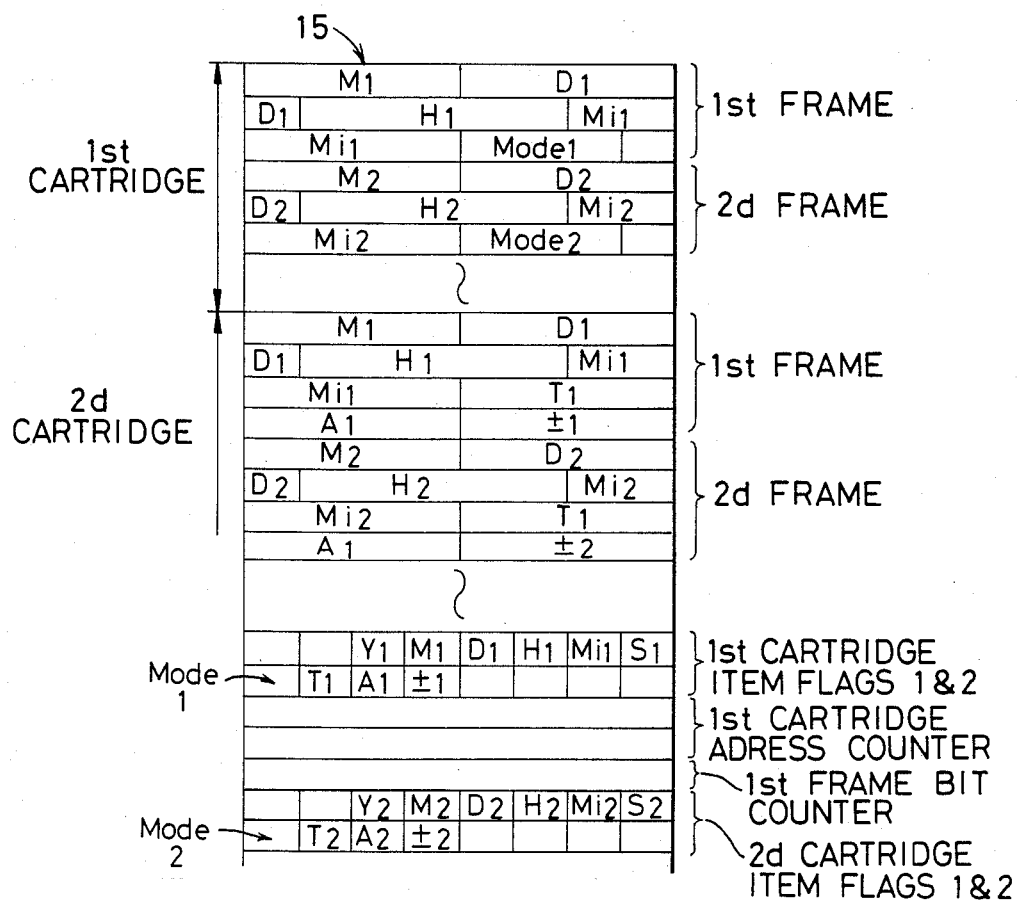
FIG. 15 is a view showing contents of a memory of a further improved embodiment.

As shown in FIG. 15, for the first film cartridge, five items of data, i.e., month (M), day (D), hour (H), minute (Mi), and photographing mode (Mode), are stored as photograph data for the first frame, second frame, ... in a 3-byte memory area without an empty area between adjacent data (in the above embodiment, a 5-byte memory area is used for storing the five items of photograph data).

In this case, the memory item flags 1 and 2 and the address counter, and a bit counter for designating the starting bit of the next memory item are provided in the same manner as in the above embodiment.

As shown in FIG. 15, for the second film cartridge, seven items of data, i.e., month (M), day (D), hour (H), minute (Mi), shutter speed (T), aperture value (A), and exposure correction value (±), are stored as photograph data of the first frame, second frame, ... without providing an empty area between adjacent data (in the above embodiment, a 7-byte memory area is used for storing the seven items of photograph data).

According to the embodiment, the memory area of the nonvolatile memory 15 can be effectively used, and photograph data for still more photograph frames than in the above embodiment can be stored.

As the photograph data, a guide number or model number of an electronic flash unit, a focal length or a full-aperture f-number of a lens, and the like can be considered in addition to the above-mentioned items.

What is claimed is:

1. A camera system having a camera body and a plurality of accessories which can be attached to said camera body, including:
    (a) generating means for generating photograph data upon a photographing operation for exposure of each frame of a film;
    (b) first memory means for storing a plurality of peculiar data representing information for respective camera accessories and for storing a plurality of discrimination data corresponding to the peculiar data, the quantity of discrimination data being smaller than that of the corresponding peculiar data;
    (c) second memory means; and
    (d) store means for storing in said second memory means photograph data and discrimination data corresponding to an accessory attached to said camera body upon said photographing operation for exposure of each frame.

2. A system according to claim 1, wherein at least some of said plurality of camera accessories consist of a plurality of photographing lenses, and peculiar data for said photographing lenses includes information associated with optical characteristics of said photographing lenses.

3. A system according to claim 2, wherein each of said plurality of camera accessories has third memory means for storing peculiar data and discrimination data.

4. A system according to claim 3, further comprising comparison means for comparing the discrimination data stored in said first memory means with the discrimination data stored in said third memory means.

5. A system according to claim 4, wherein if said comparison means detects that said discrimination data in said third memory means is not stored in said first memory means it generates a detection signal.

6. A system according to claim 5, further comprising means responsive to the detection signal for storing the content of said third memory means in said first memory means.

7. A camera system including:
    (a) photographing means for performing photographing operations to expose frames of film in film cartridges;
    (b) memory means having a plurality of areas;
    (c) means for storing film data indicative of a film cartridge in a corresponding area of said memory means for each cartridge loaded in said camera system;
    (d) means responsive to a photographing operation for producing photograph data indicative of information with respect to said photographing operation and for storing said photograph data in the area of said memory means corresponding to the cartridge loaded in said camera system; and
    (e) printing means for printing said film data and said photograph data stored in said area of the memory means on the film of a cartridge loaded in said camera system.

8. A camera system according to claim 7, which further comprises counting means for counting a total number of photographed film cartridges each of which has been loaded in said camera system, wherein said film data indicates the total number of film cartridges counted by said counting means.

9. A camera system according to claim 8, wherein said camera system includes another memory means that stores said total number of film cartridges.

10. A camera system according to claim 7, which further comprises means for detecting that a film cartridge is loaded in said camera system and generating a detection signal, wherein, prior to a photographing operation, said printing means prints said film data stored in said memory means on the film of the loaded cartridge in response to said detection signal.

11. A camera system according to claim 7, which further comprises means for withdrawing a predetermined number of frames of film from a cartridge of film loaded in said camera system, wherein said printing means prints said film data stored in said memory means on the withdrawn film in response to the completion of the withdrawing.

12. A camera system including:
    (a) means for detecting that a cartridge of film is loaded in said camera system and generating a detection signal;
    (b) photographing means for performing a photographing operation to expose a frame of said film;
    (c) producing means for producing film data with respect to the film; and
    (d) printing means responsive to said detection signal for printing said film data on the film prior to said photographing operation.

13. A camera system according to claim 12, which further comprises memory means, wherein said producing means stores said film data in said memory means and said printing means prints film data stored in said memory means on the film.

14. A camera system according to claim 13, which further comprises counting means for counting a total number of photographed film cartridges each of which has been loaded in said camera system, wherein said film data indicates the total number of film cartridges counted by said counting means.

15. A camera system according to claim 14, wherein said camera system includes another memory means that stores said total number of film cartridges and wherein said counting means increments the content of said another memory means.

16. A camera system including:
   (a) means for withdrawing a predetermined number of frames of film from a cartridge of film loaded in said camera system;
   (b) means for detecting the withdrawing of said predetermined number of frames of film and producing a detection signal;
   (c) photographing means for performing a photographing operation to expose a frame of said film;
   (d) producing means for producing film data with respect to the film; and
   (e) printing means responsive to said detection signal for printing said film data on the film prior to a photographing operation.

17. A camera system according to claim 16, which further comprises memory means, wherein said producing means stores said film data in said memory means and said printing means prints said film data stored in said memory means on the film.

18. A camera system according to claim 17, which further comprises counting means for counting a total number of photographed film cartridges each of which has been loaded in said camera system, wherein said film data indicates the total number of film cartridges counted by said counting means.

19. A camera system according to claim 18, wherein said camera system includes another memory means that stores said total number in said another memory means and wherein said counting means increments the content of said another memory means.

20. A camera system having a camera body and a plurality of accessories, each of which can be attached to said camera body, comprising:
   (a) photographing means for performing photographing operations to expose frames of a film;
   (b) generating means for generating photograph data in response to said photographing operation;
   (c) first memory means in which a plurality of peculiar data and a plurality of discrimination data are stored, said peculiar data representing information with respect to said accessories, said discrimination data corresponding to respective peculiar data, but being smaller in quantity than the corresponding peculiar data;
   (d) second memory means having a plurality of memory parts; and
   (e) means for storing photograph data and discrimination data for one of said accessories attached to said camera body in a respective part of said second memory means for every photographing operation.

21. A camera system according to claim 20, wherein said accessories include a plurality of photographing lenses.

22. A camera system having a camera body and a plurality of accessories which can be attached to said camera body, comprising:
   (a) memory means for storing therein a plurality of data indicative of information with respect to said plurality of accessories;
   (b) detecting means for detecting that data for an accessory attached to said camera body is not stored in said memory means and outputting a detection signal; and
   (c) storing means responsive to said detection signal for storing in said memory means data for the accessory attached to said camera body.

23. A camera system according to claim 22, wherein said accessories include a plurality of photographing lenses, and wherein each of said photographing lenses has another memory means in which data indicative of an optical characteristic of that lens is stored.

24. A camera system according to claim 23, wherein said detecting means has means for comparing data stored in the first-mentioned memory means with data of said another memory means of an accessory attached to said camera body, and wherein said storing means stores in the first-mentioned data stored in another memory means.

25. A camera system capable of loading film means therein, wherein said film means has film and a cartridge of said film, said camera system including:
   (a) means for withdrawing a predetermined number of frames of film from said cartridge of said film means loaded in said camera system;
   (b) means for detecting the withdrawing of said predetermined number of frames of film and producing a detection signal;
   (c) photographing means for performing a photographing operation to expose a frame of said film;
   (d) producing means for producing film data with respect to the film; and
   (e) outputting means responsive to said detection signal for outputting said film data to said film means loaded in said camera system prior to said photographing operation.

26. A camera system according to claim 25, which further comprises memory means, wherein said producing means stores said film data in said memory means and said outputting means outputs said film data stored in said memory means to said film means.

27. A camera system according to claim 26, which further comprises means for generating photograph data upon said photographing operation for exposure of each frame of said film and storing said photograph data in said memory means.

28. A camera system according to claim 25, which further comprises counting means for counting a total number of photographed film means each of which has been loaded in said camera system, wherein said film data indicates the total number of film means counted by said counting means.

29. A camera system capable of loading film means therein, wherein said film means has film and a cartridge of said film, said camera system including:
   (a) means for withdrawing a predetermined number of frames of film from said cartridge of said film means loaded in said camera system;
   (b) means for detecting the withdrawing of said predetermined number of frames of film and producing a detection signal;
   (c) photographing means for performing a photographing operation to expose a frame of said film;
   (d) producing means for producing film data with respect to the film; and
   (e) recording means responsive to said detection signal for recording said film data on said film means loaded in said camera system prior to said photographing operation.

30. A camera system according to claim 29, which further comprises memory means, wherein said producing means stores said film data in said memory means and said recording means records said film data stored in said memory means on said film means.

31. A camera system according to claim 30, which further comprises means for generating photograph data upon said photographing operation for exposure of each frame of said film and storing said photograph data in said memory means.

32. A camera system according to claim 29, which further comprises counting means for counting a total number of photographed film means each of which has been loaded in said camera system, wherein said film data indicates the total number of film means counted by said counting means.

33. A camera system capable of loading film means therein, wherein said film means has film and a cartridge of said film, said camera system including:
  (a) means for detecting that said cartridge is loaded in said camera system and generating a detection signal;
  (b) photographing means for performing a photographing operation to expose a frame of said film;
  (c) producing means for producing film data with respect to the film; and
  (d) outputting means responsive to said detection signal for outputting said film data to said film means loaded in said camera system prior to said photographing operation.

34. A camera system according to claim 33, which further comprises memory means, wherein said producing means stores said film data in said memory means and said outputting means outputs said film data stored in said memory means to said film means.

35. A camera system according to claim 34, which further comprises means for generating photograph data upon said photographing operation for exposure of each frame of said film and storing said photograph data in said memory means.

36. A camera system according to claim 33, which further comprises counting means for counting a total number of photographed film means each of which has been loaded in said camera system, wherein said film data indicates the total number of film means counted by said counting means.

37. A camera system capable of loading film means therein, wherein said film means has film and a cartridge of said film, said camera system including:
  (a) means for detecting that said cartridge is loaded in said camera system and generating a detection signal;
  (b) photographing means for performing a photographing operation to expose a frame of said film;
  (c) producing means for producing film data with respect to the film; and
  (d) recording means responsive to said detection signal for recording said film data on said film means loaded in said camera system prior to said photographing operation.

38. A camera system according to claim 37, which further comprises memory means, wherein said producing means stores said film data in said memory means and said recording means records said film data stored in said memory means on said film means.

39. A camera system according to claim 38, which further comprises means for generating photograph data upon said photographing operation for exposure of each frame of said film and storing said photograph data in said memory means.

40. A camera system according to claim 37, which further comprises counting means for counting a total number of photographed film means each of which has been loaded in said camera system, wherein said film data indicates the total number of film means counted by said counting means.

41. A camera system capable of loading film means therein, wherein said film means has film and a cartridge of said film, said camera system including:
  (a) means for detecting that said film means is loaded in said camera system and generating a detection signal;
  (b) producing means responsive to said detection signal for producing film data with respect to said film means loaded in said camera system; and
  (c) outputting means for outputting said film data to said film means loaded in said camera system.

42. A camera system according to claim 41, wherein said producing means has counting means for counting a total number of photographed cartridges each of which has been loaded in said camera system, and wherein said film data conform to said the total number of cartridges counted by said counting means.

43. A camera system capable of loading film means therein, wherein said film means has a film and a cartridge of said film, said camera system including:
  (a) means for detecting that said film means is loaded in said camera system and producing a detection signal;
  (b) producing means responsive to said detection signal for producing film data with respect to said film means loaded in said camera system; and
  (c) recording means for recording said film data on said film means loaded in said camera system.

44. A camera system according to claim 43, wherein said film data recorded on a plurality of film means, which have been loaded in said camera system, are different from each other.

45. A camera system according to claim 41, wherein said producing means has counting means for counting a total number of photographed cartridges each of which has been loaded in said camera system, and wherein said film data conform to the total number of cartridges counted by said counting means.

* * * * *